United States Patent
Lee et al.

(10) Patent No.: US 9,867,216 B2
(45) Date of Patent: Jan. 9, 2018

(54) METHOD AND APPARATUS FOR PERFORMING ACCESS CONTROL IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 12 days.

(21) Appl. No.: 14/897,197

(22) PCT Filed: Jun. 16, 2014

(86) PCT No.: PCT/KR2014/005238
§ 371 (c)(1),
(2) Date: Dec. 9, 2015

(87) PCT Pub. No.: WO2014/204144
PCT Pub. Date: Dec. 24, 2014

(65) Prior Publication Data
US 2016/0150566 A1    May 26, 2016

Related U.S. Application Data

(60) Provisional application No. 61/835,623, filed on Jun. 16, 2013.

(51) Int. Cl.
*H04B 7/00* (2006.01)
*H04W 74/08* (2009.01)
(Continued)

(52) U.S. Cl.
CPC ....... *H04W 74/085* (2013.01); *H04W 74/008* (2013.01); *H04W 48/02* (2013.01); *H04W 74/0833* (2013.01)

(58) Field of Classification Search
CPC ......... H04L 47/10; H04L 47/30; H04L 47/11; H04L 47/12; H04L 2012/5631;
(Continued)

(56) References Cited

U.S. PATENT DOCUMENTS

2011/0244907 A1* 10/2011 Golaup ................ H04W 4/005
                                                            455/509
2011/0274040 A1    11/2011 Pani et al.
(Continued)

FOREIGN PATENT DOCUMENTS

JP    2013520103 A    5/2013
JP    2013536636 A    9/2013
(Continued)

OTHER PUBLICATIONS

PCT International Application No. PCT/KR2014/005238, Written Opinion of the International Searching Authority dated Aug. 29, 2014, 1 page.
(Continued)

*Primary Examiner* — Brenda H Pham
(74) *Attorney, Agent, or Firm* — Lee Hong Degerman Kang Waimey

(57) ABSTRACT

A method and apparatus for performing access control in a wireless communication is provided. A user equipment (UE) receives an access control parameter and a backoff parameter from a network, and determines whether to apply the access control parameter or the backoff parameter based on applications. If it is determined to apply the access control parameter, the UE applies the access control parameter instead of the backoff parameter.

11 Claims, 7 Drawing Sheets

(51) Int. Cl.
  *H04W 74/00* (2009.01)
  *H04W 48/02* (2009.01)
(58) Field of Classification Search
  CPC ..... H04L 47/15; H04L 47/2441; H04L 47/70; H04L 47/35; H04L 47/32; H04W 74/085; H04W 48/02; H04W 74/008; H04W 74/0833
  USPC ....... 370/229, 230, 235, 252, 322, 349, 445, 370/447, 448, 461, 462
  See application file for complete search history.

(56) References Cited

U.S. PATENT DOCUMENTS

| | | | |
|---|---|---|---|
| 2012/0039171 A1 | 2/2012 | Yamada et al. | |
| 2012/0269122 A1* | 10/2012 | Lee ................... | H04W 76/066 370/328 |
| 2012/0282965 A1* | 11/2012 | Kim .................... | H04W 48/06 455/515 |
| 2013/0039274 A1 | 2/2013 | Lee | |
| 2013/0040597 A1* | 2/2013 | Jang ................... | H04W 48/02 455/404.1 |
| 2016/0150573 A1 | 5/2016 | Pani et al. | |

FOREIGN PATENT DOCUMENTS

| | | |
|---|---|---|
| JP | 2014506742 A | 3/2014 |
| WO | 2010/107354 | 9/2010 |
| WO | 2012020849 A1 | 2/2012 |
| WO | 2012097589 A1 | 7/2012 |
| WO | 2013021318 A1 | 2/2013 |

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, section 6.3.1, pp. 167-185 (21 pages provided).

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, section 10.1.5, pp. 72-76 (7 pages provided).

3rd Generation Partnership Project, "Technical Specification Group Radio Access Network; Evolved Universal Terrestrial Radio Access (E-UTRA); Medium Access Control (MAC) protocol specification (Release 11)", 3GPP TS 36.321 V11.2.0, Mar. 2013, section 5.1, pp. 13-17 (7 pages provided).

Telefon AB LM Ericsson et al., "MTC Device Supplemental Access Control", 3GPP TSG GERAN #45bis, GP-100890, May 12, 2010, 3 pages.

3rd Generation Partnership Project, "Technical Specification Group Services and System Aspects; Access Class Barring and Overload Protection; (Release 7)", 3GPP TR 23.898 V7.0.0, Mar. 2005, 28 pages.

Intel Corporation, "EAB for RAN overload protection", 3GPP TSG RAN WG2 Meeting #74, R2-113217, May 3, 2011, 4 pages.

NTT DoCoMo et al., "Requirements for Application and Service Access Control", 3GPP TSG-SA WG1 Meeting #62, S1-133056, Apr. 26, 2013, 4 pages.

European Patent Office Application No. 14813598.1, Search Report dated Dec. 20, 2016, 12 pages.

* cited by examiner (a)

(b)

METHOD AND APPARATUS FOR PERFORMING ACCESS CONTROL IN WIRELESS COMMUNICATION SYSTEM

CROSS-REFERENCE TO RELATED APPLICATIONS

This application is the National Stage filing under 35 U.S.C. 371 of International Application No. PCT/KR2014/005238, filed on Jun. 16, 2014, which claims the benefit of U.S. Provisional Application No. 61/835,623, filed on Jun. 16, 2013, the contents of which are all hereby incorporated by reference herein in their entirety.

BACKGROUND OF THE INVENTION

Field of the Invention

The present invention relates to wireless communications, and more particularly, to a method and apparatus for performing access control in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Application and service access control (ASAC) is a mechanism for the operator to allow/prevent new access attempts from particular, operator-identified applications, multimedia telephony (MMTel) voice service and MMTel video service, in the UE whilst it is in idle mode. The network can prevent/mitigate overload of the access network and/or the core network.

The network cannot selectively prevent some mobile originating (MO) calls in congestion for UEs in a radio resource control (RRC) connected state (RRC_CONNECTED), while allowing other MO calls for UEs in RRC_CONNECTED. Accordingly, for enhancement of the ASAC, a method for performing access control in which only some applications are selectively prevented may be required.

SUMMARY OF THE INVENTION

The present invention provides a method and apparatus for performing access control in a wireless communication system. The present invention provides a method for applying one of an access control parameter or a back off parameter based on applications. The present invention provides a method for receiving a configuration which indicates whether a user equipment should apply an access control parameter or a backoff parameter based on applications.

In an aspect, a method for performing, by a user equipment (UE), access control in a wireless communication is provided. The method includes receiving an access control parameter and a backoff parameter from a network, determining whether to apply the access control parameter or the backoff parameter based on applications, and applying the determined parameter.

The method may further include receiving a configuration, which indicates whether the UE should apply the access control parameter or the backoff parameter based on the applications, from the network.

The access control parameter may be one of access class barring information received from system information or service specific access control information received from the system information.

The access control parameter may indicate skipping of applying random access backoff for a random access preamble or a scheduling request.

The access control parameter may include barring time and a barring factor.

The access control parameter may be received via one of system information, a random access response, medium access control (MAC) control element, or a radio resource control (RRC) message on a dedicated control channel (DCCH).

It may be determined to apply the access control parameter if the applications correspond to one or more specific mobile originating (MO) accesses.

The one or more specific mobile originating (MO) accesses may include at least one of emergency access, high priority access, access for Internet protocol (IP) multimedia subsystem (IMS) signaling, access for multimedia telephony (MMTEL) applications, mobile terminating access, or access for mobile originating signaling.

It may be determined to apply the access control parameter if the access control parameter indicates that the UE should apply the access control parameter before transmitting a random access preamble or a scheduling request for one or more specific MO accesses.

It may be determined to apply the access control parameter if a random access or a scheduling request is initiated due to one or more specific MO accesses.

If it is determined to apply the access control parameter, the applying determined parameter may include determining whether or not to delay transmission of a random access preamble or a scheduling request according to the access control parameter.

If it is determined to apply the backoff parameter, the applying determined parameter may include determining whether or not to delay transmission of a random access preamble or a scheduling request according to the backoff parameter.

The UE may be in an RRC connected state (RRC_CONNECTED).

In another aspect, a user equipment (UE) in a wireless communication is provided. The UE includes a radio frequency (RF) unit for transmitting or receiving a radio signal, and a processor coupled to the RF unit, and configure to receive an access control parameter and a backoff parameter from a network, determine whether to apply the access control parameter or the backoff parameter based on applications, and apply the determined parameter.

The network can selectively prevent some mobile originating (MO) calls in congestion for UEs, while allowing other MO calls for UEs.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
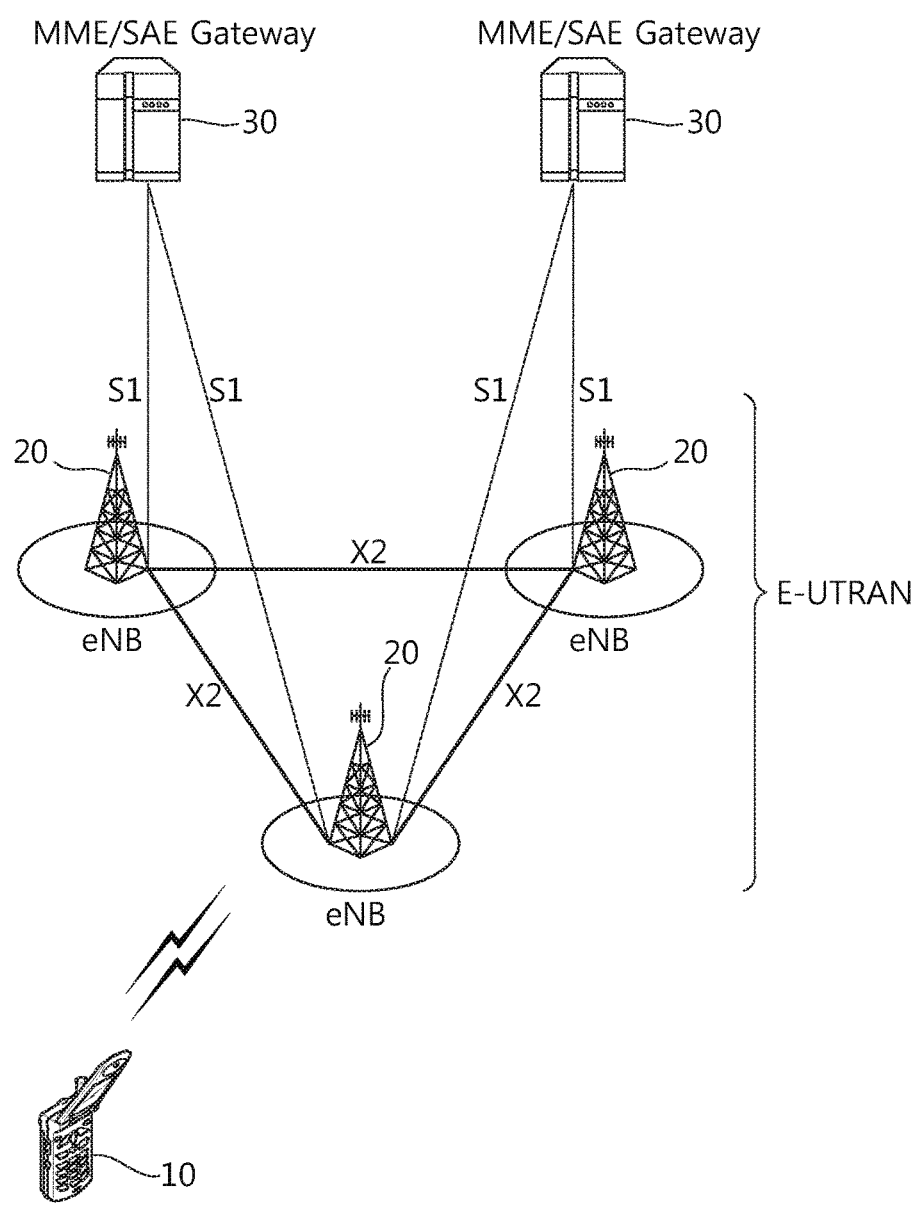
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
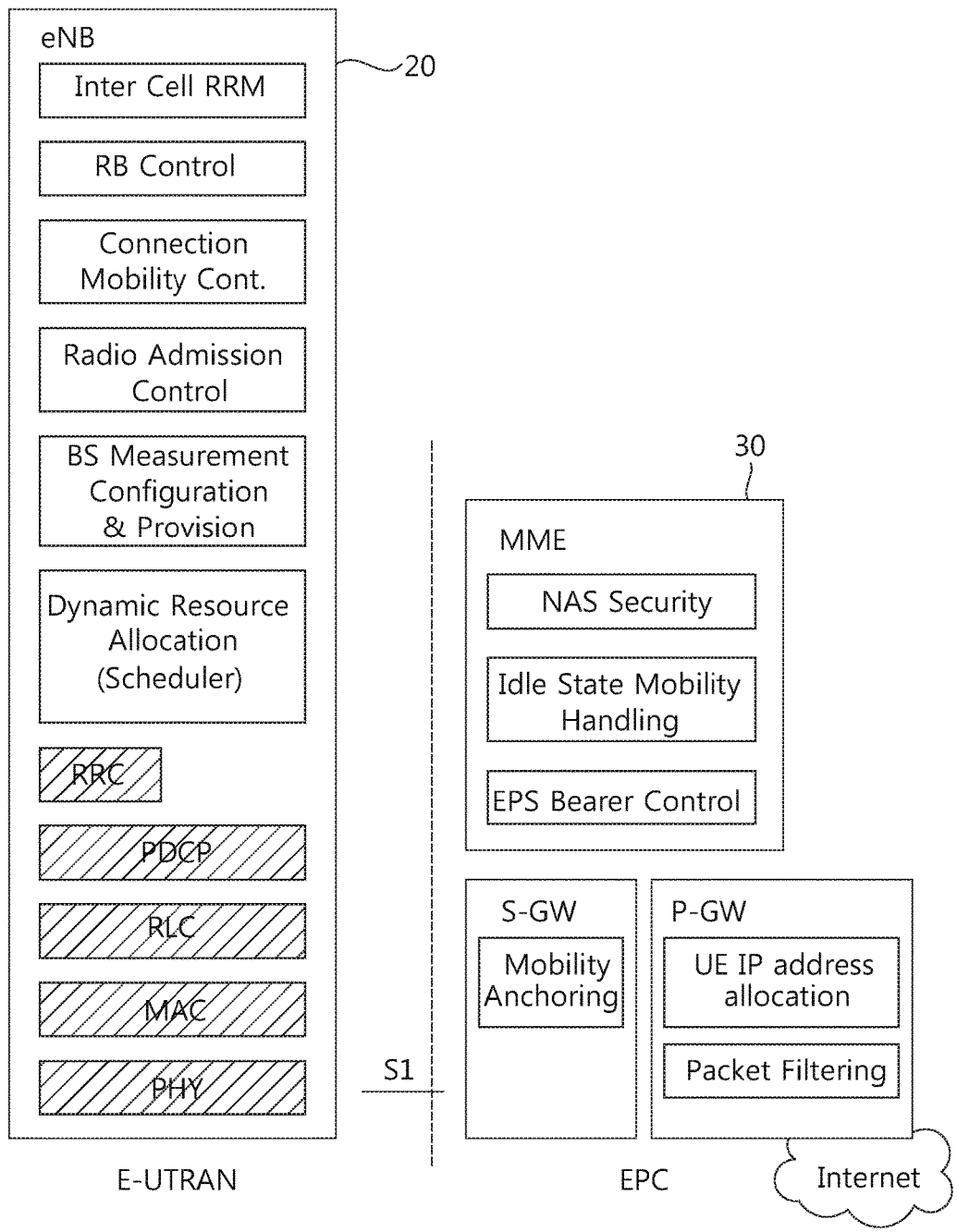
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
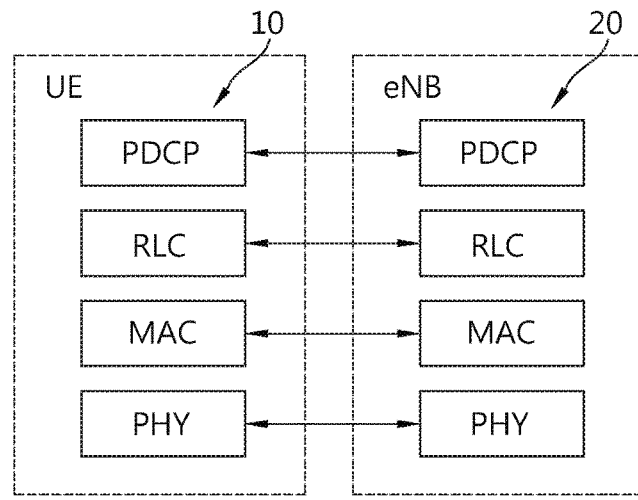
FIG. 3 shows a block diagram of a user plane protocol stack and a control plane protocol stack of an LTE system.
Figure 3:
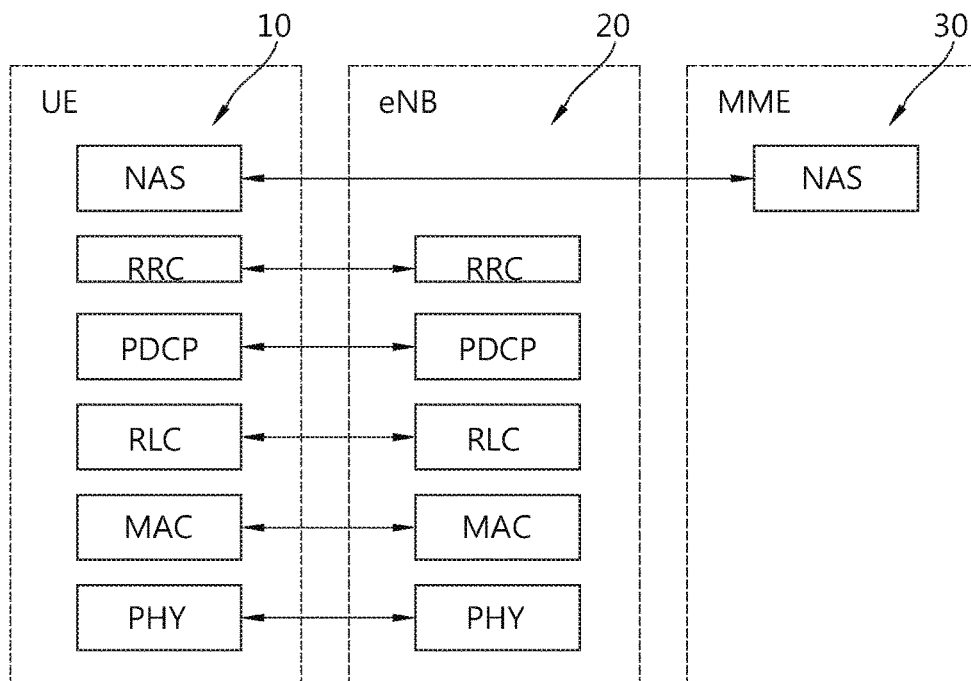

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
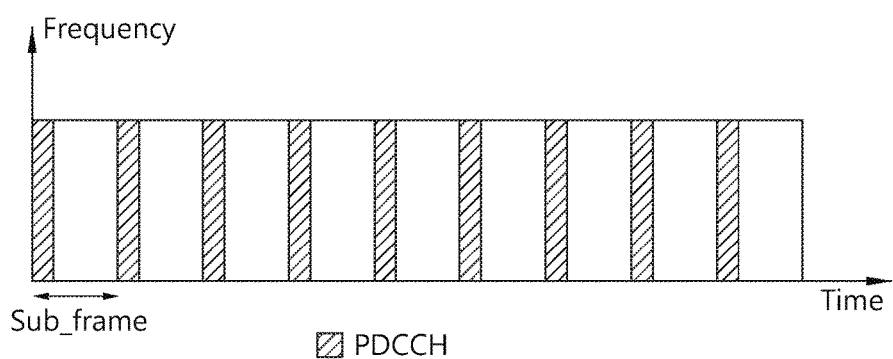
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-topoint channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-($a$), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-($b$), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Application and service access control (ASAC) is described.

The following requirements apply:

This feature shall be applicable to E-UTRAN only.

This feature shall be applicable to UEs in idle mode only that are not a member of one or more out of 5 special categories (access classes 11 to 15) applicable in registered public land mobile network (RPLMN).

The following requirements apply for ASAC for applications:

The serving network, based on operator policy, roaming agreements, and subject to regional regulations, shall be able to configure ASAC-compliant UEs, belonging to its subscribers and its inbound roamers, with lists (ASAC profiles) of applications that are subject to ASAC and the associated potential different access permissions for traffic initiated by these applications.

The serving network, based on operator policy, roaming agreements, and subject to regional regulations, shall be able to broadcast, in one or more specified areas of the RAN, necessary information, determining an ASAC profile, to guide the behavior of ASAC-compliant UEs in these areas. The ASAC-compliant UE shall allow/prevent access attempts from applications based on the ASAC profile in the UE and the information provided from the network.

If access attempt for a given application is allowed, the UE may attempt access for this application, provided access attempts from this UE are not otherwise barred.

If access attempt for a given application is not allowed, the UE shall not attempt access for this application, even if access attempts from this UE are allowed.

The following requirements apply for ASAC for services:

The serving network, based on operator policy and subject to regional regulations, shall be able to broadcast, in one or more specified areas of the RAN, necessary information for ASAC-compliant UEs to allow access attempts for telephony services (MMTEL) only i.e., one or both of MMTEL voice service and MMTEL video service, while preventing access attempts for all other data communication.

The UE shall determine duration of the period to use ASAC for service in such a manner to allow the affected areas of RAN to return to normal state in a graceful way.

If the network indicates access attempts for MMTEL voice and/or MMTEL video services are allowed, the UE may only attempt access for MMTEL voice and/or MMTEL video services and shall consider access attempts for any other service are not allowed. This UE shall ignore SSAC settings.

Access barring check is described. It may be referred to Section 5.3.3.11 of 3GPP TS 36.331 V11.3.0 (2013-03). For RRC connection establishment, a UE performs access class barring.

1> if timer T302 or "Tbarring" is running:
2> consider access to the cell as barred;
1> else if SystemInformationBlockType2 includes "AC barring parameter":
2> if the UE has one or more access classes, as stored on the universal subscriber identity module (USIM), with a value in the range 11 . . . 15, which is valid for the UE to use, and
2> for at least one of these valid access classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in "AC barring parameter": "Tbarring"=(0.7+0.6*rand)*ac-BarringTime.

Table 1 shows an example of the SystemInformationBlockType2 information element (IE). It may be referred to Section 6.3.1 of 3GPP TS 36.331 V11.3.0 (2013-03). The SystemInformationBlockType2 IE contains radio resource configuration information that is common for all UEs.

TABLE 1

```
-- ASN1START
SystemInformationBlockType2 ::=            SEQUENCE {
    ac-BarringInfo                              SEQUENCE {
        ac-BarringForEmergency                      BOOLEAN,
        ac-BarringForMO-Signalling                  AC-BarringConfig
            OPTIONAL,  -- Need OP
        ac-BarringForMO-Data                        AC-BarringConfig
            OPTIONAL   -- Need OP
    }
                                               OPTIONAL,  -- Need OP
    radioResourceConfigCommon
        RadioResourceConfigCommonSIB,
    ue-TimersAndConstants                      UE-TimersAndConstants,
    freqInfo                                   SEQUENCE {
        ul-CarrierFreq                             ARFCN-ValueEUTRA        OPTIONAL,  -- Need OP
        ul-Bandwidth                               ENUMERATED {n6, n15, n25, n50, n75, n100}
                                               OPTIONAL,  -- Need OP
        additionalSpectrumEmission
            AdditionalSpectrumEmission
    },
    mbsfn-SubframeConfigList                   MBSFN-SubframeConfigList
            OPTIONAL,  -- Need OR
    timeAlignmentTimerCommon                   TimeAlignmentTimer,
    ...,
    lateNonCriticalExtension                   OCTET STRING (CONTAINING SystemInformationBlockType2-v8h0-IEs)
        OPTIONAL,       -- Need OP
    [[      ssac-BarringForMMTEL-Voice-r9          AC-BarringConfig
            OPTIONAL,  -- Need OP
```

TABLE 1-continued

```
            ssac-BarringForMMTEL-Video-r9     AC-BarringConfig
                OPTIONAL   -- Need OP
    ]],
    [[      ac-BarringForCSFB-r10            AC-BarringConfig
                OPTIONAL   -- Need OP
    ]]
}
SystemInformationBlockType2-v8h0-IEs ::=    SEQUENCE {
    multiBandInfoList                       SEQUENCE (SIZE
(1..maxMultiBands)) OF AdditionalSpectrumEmission  OPTIONAL, -- Need OR
    nonCriticalExtension                    SystemInformationBlockType2-v9e0-IEs
        OPTIONAL       -- Need OP
}
SystemInformationBlockType2-v9e0-IEs ::= SEQUENCE {
    ul-CarrierFreq-v9e0                     ARFCN-ValueEUTRA-
v9e0            OPTIONAL,  -- Cond ul-FreqMax
    nonCriticalExtension                    SEQUENCE { }
        OPTIONAL   -- Need OP
}
AC-BarringConfig ::=                        SEQUENCE {
    ac-BarringFactor                        ENUMERATED {
    p00, p05, p10, p15, p20, p25, p30, p40,
    p50, p60, p70, p75, p80, p85, p90, p95},
    ac-BarringTime                          ENUMERATED {s4, s8,
s16, s32, s64, s128, s256, s512},
    ac-BarringForSpecialAC                  BIT STRING (SIZE(5))
}
MBSFN-SubframeConfigList ::=                SEQUENCE (SIZE (1..maxMBSFN-
Allocations)) OF MBSFN-SubframeConfig
-- ASN1STOP
```

Referring to Table 1, the SystemInformationBlockType2 IE includes the AC barring parameter. The ac-BarringFactor field indicates that if the random number drawn by the UE is lower than this value, access is allowed. Otherwise the access is barred. The ac-BarringForCSFB field indicates access class barring for mobile originating circuit switched (CS) fallback. The ac-BarringForEmergency field indicates access class barring for AC 10. The ac-BarringForMO-Data field indicates access class barring for mobile originating calls. The ac-BarringForMO-Signalling field indicates access class barring for mobile originating signaling. The ac-BarringForSpecialAC field indicates access class barring for AC 11-15. The first/leftmost bit is for AC 11, the second bit is for AC 12, and so on. The ac-BarringTime field indicates access barring time value in seconds. The ssac-BarringForMMTEL-Video field indicates service specific access class barring for MMTEL video originating calls. The ssac-BarringForMMTEL-Voice field indicates service specific access class barring for MMTEL voice originating calls.

A random access procedure is described. It may be referred to Section 10.1.5 of 3GPP TS 36.300 V11.5.0 (2013-03).

The random access procedure is characterized by:
Common procedure for FDD and TDD;
One procedure irrespective of cell size and the number of serving cells when carrier aggregation (CA) is configured.

The random access procedure is performed for the following events related to the primary cell (PCell):
Initial access from RRC_IDLE;
RRC connection re-establishment procedure;
Handover;
DL data arrival during RRC_CONNECTED requiring random access procedure (e.g., when UL synchronization status is "non-synchronizd");
UL data arrival during RRC_CONNECTED requiring random access procedure (e.g., when UL synchronization status is "non-synchronized" or there are no PUCCH resources for scheduling request (SR) available);
For positioning purpose during RRC_CONNECTED requiring random access procedure (e.g., when timing advance is needed for UE positioning);

The random access procedure is also performed on a secondary cell (SCell) to establish time alignment for the corresponding secondary timing advance group (sTAG).

Furthermore, the random access procedure takes two distinct forms:
Contention based (applicable to first five events);
Non-contention based (applicable to only handover, DL data arrival, positioning and obtaining timing advance alignment for a sTAG).

Normal DL/UL transmission can take place after the random access procedure.

A relay node (RN) supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

Figure 5:
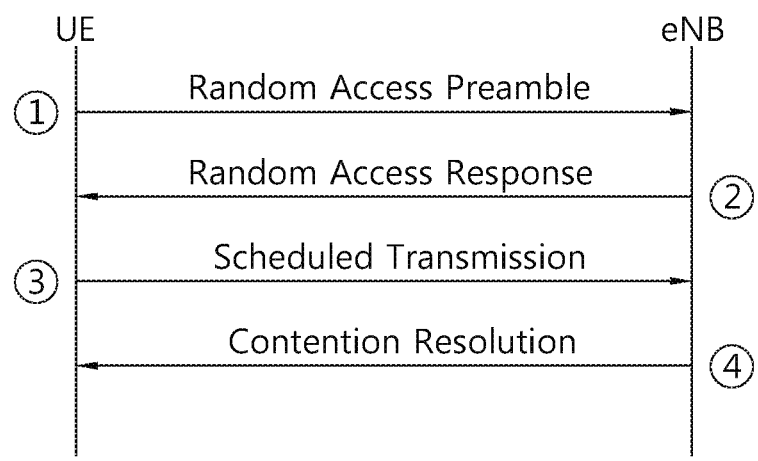
FIG. 5 shows a contention based random access procedure.

FIG. 5 shows a contention based random access procedure.

The four steps of the contention based random access procedures are:

1) Random access preamble on RACH in uplink (message 1): There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds is broadcast on system information.

2) Random access response generated by MAC on DL-SCH (message 2): The message 2 may be semi-synchronous (within a flexible window of which the size is one or more TTI) with message 1. The message 2 may not use HARQ. The message 2 may be addressed to random access radio network temporary identity (RA-RNTI) on PDCCH. The message 2 may convey at least RA-preamble identifier, timing alignment information for the primary timing advance group (pTAG), initial UL grant and assignment of temporary cell RNTI (C-RNTI) (which may or may not be made permanent upon contention resolution). The message 2 may be intended for a variable number of UEs in one DL-SCH message.

3) First scheduled UL transmission on UL-SCH (message 3): The message 3 may use HARQ. Size of the transport blocks depends on the UL grant conveyed in step 2 and is at least 80 bits. For initial access, the message 3 may convey the RRC Connection Request generated by the RRC layer and transmitted via CCCH, or may convey at least NAS UE identifier but no NAS message. For RRC connection re-establishment procedure, the message 3 may convey the RRC connection re-establishment request generated by the RRC layer and transmitted via CCCH. The message 3 may not contain any NAS message. After handover, in the target cell, the message 3 may convey the ciphered and integrity protected RRC handover confirm generated by the RRC layer and transmitted via DCCH, or may convey the C-RNTI of the UE (which was allocated via the handover command). The message 3 may include an uplink buffer status report when possible. For other events, the message 3 may convey at least the C-RNTI of the UE.

4) Contention resolution on DL (message 4): Early contention resolution shall be used, i.e., eNB does not wait for NAS reply before resolving contention. The message 4 may be not synchronized with message 3. HARQ is supported. The message 4 may be addressed to the temporary C-RNTI on PDCCH for initial access and after radio link failure, and/or the C-RNTI on PDCCH for UE in RRC_CONNECTED. HARQ feedback is transmitted only by the UE which detects its own UE identity, as provided in message 3, echoed in the contention resolution message.

The temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

Random access backoff is described. It may be referred to Section 5.1.4 of 3GPP TS 36.321 V11.2.0 (2013-03). For random access and scheduling request, a UE may perform random access backoff and scheduling request.

At first, the backoff parameter in the UE is set to 0 ms. If the random access response contains a backoff indicator subheader, the backoff parameter value in the UE is set as indicated by the BI field of the backoff indicator subheader and backoff parameter values shows in Table 2 below. Else, the backoff parameter value in the UE is set to 0 ms.

TABLE 2

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

If in this random access procedure, the random access preamble was selected by MAC based on the backoff parameter in the UE, a random backoff time according to a uniform distribution between 0 and the backoff parameter value is selected. Accordingly, the subsequent random access transmission is delayed by the backoff time.

According to the prior art, the network cannot selectively prevent some mobile originating (MO) calls in congestion for UEs in RRC_CONNECTED, while allowing other MO calls for UEs in RRC_CONNECTED. Specifically, random access backoff may be always applied regardless of a type of applications or services. Accordingly, a method for solving this problem of the prior art may be required.

Figure 6:
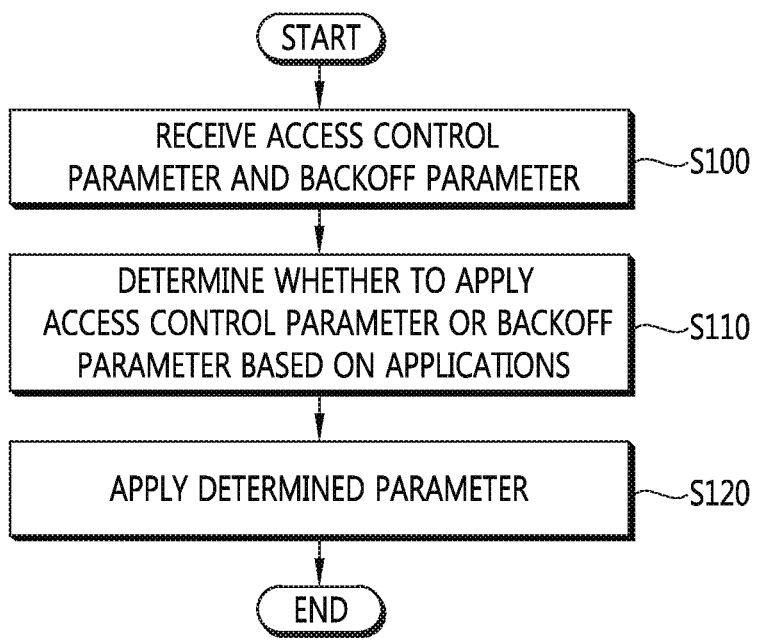
FIG. 6 shows an example of a method for performing access control according to an embodiment of the present invention.

FIG. 6 shows an example of a method for performing access control according to an embodiment of the present invention.

In step S100, the UE, in RRC_CONNECTED, receives an access control parameter and a backoff parameter from a network. The access control parameter may be received via one of system information, a random access response, MAC control element, or an RRC message on a DCCH). The access control parameter may indicate that the UE should apply the access control parameter before transmitting a random access preamble and scheduling request, for one or more specific mobile originating accesses. The access control parameter may indicate skipping of applying random access backoff for a random access preamble or a scheduling request. The access control parameter may be one of access class barring information received from the system information or service specific access control information received from the system information, described in Table 1 above. The access control parameter may include barring time and a barring factor. The backoff parameter may refer to Table 2 described above.

The one or more specific mobile originating accesses may be indicated by the network. The one or more specific mobile originating access may be one or more of emergency access, high priority access, access for IP multimedia subsystem (IMS) signaling (on radio bearer with QoS class of identifier (QCI)=5), access for MMTEL applications (such as MMTEL-voice and MMTEL-video), mobile terminating access, and access for mobile originating signaling (such as RRC signaling, NAS signaling, L2 control information, e.g., MAC control element).

The UE may further receive a configuration, which indicates whether the UE should apply the access control parameter or the backoff parameter based on the applications, from the network. That is, the configuration may indicate whether the UE should apply the access control parameter or the backoff parameter for the one or more specific mobile originating accesses.

In step S110, the UE determines whether to apply the access control parameter or the backoff parameter based on applications. The UE is configured to apply the access control parameter if the received access control parameter indicates that the UE should apply the access control parameter before transmitting a random access preamble and scheduling request, for the one or more specific mobile originating accesses, and if a random access or scheduling request is initiated due to one of the one or more specific mobile originating accesses.

The upper layer of the UE may indicate to the RRC/MAC layer of the UE that this access request such as random access or scheduling request is initiated due to one of the one or more specific mobile originating accesses. The UE may recognize that this access request such as random access or scheduling request is initiated due to one of the one or more specific mobile originating accesses, by checking the establishment cause used for the current RRC connection. The UE may recognize that this access request such as random access or scheduling request is initiated due to IMS signaling, if this access comes from the radio bearer with QCI=5. The UE may recognize that this access request such as random access or scheduling request is initiated due to emergency access, if the UE has established the current RRC connection with establishment cause set to 'emergency access'. The UE may recognizes that this access request such as random access or scheduling request is initiated due to high priority access, if the UE has established the current RRC connection with establishment cause set to 'high priority access' or if the UE has special AC (i.e., one of AC 11-15) in its USIM.

In step S120, the UE applies the determined parameter. If the UE is configured to apply the access control parameter, the UE may determine whether or not to delay transmission of a random access preamble (and scheduling request, such as dedicated scheduling request (D-SR)), according to the access control parameter (such as barring time or barring time). For example, the UE may determine whether or not delay transmission of a random access preamble and scheduling request according to the barring factor. If the UE is configured to apply the backoff parameter, the UE may determine whether or not to delay transmission of a random access preamble, according to the backoff parameter.

If the UE determines delaying transmission of a random access preamble (or scheduling request, such as D-SR), the UE may delays transmission of a random access preamble (or scheduling request, such as D-SR) according to the access control parameter. For example, the UE may delay transmission of a random access preamble and scheduling request for the barring time. Then, the UE determines whether or not to delay transmission of a random access preamble and scheduling request according to the access control parameter, again. Otherwise, the UE may transmit a random access preamble or scheduling request without delay.

Figure 7:
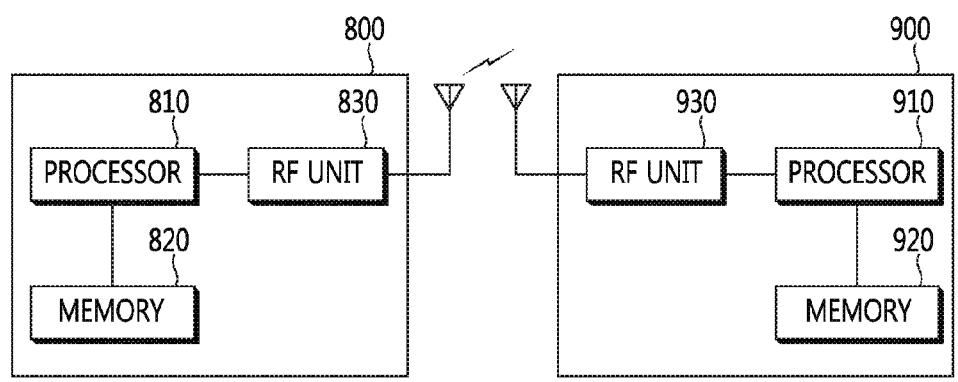
FIG. 7 shows a wireless communication system to implement an embodiment of the present invention.

FIG. 7 shows a wireless communication system to implement an embodiment of the present invention.

An eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), access control in a wireless communication, the method comprising:
   receiving, by the UE, an access control parameter and a backoff parameter from a network; and
   if the access control parameter indicates that the UE should apply the access control parameter before transmitting a random access preamble or a scheduling request for one or more specific mobile originating (MO) accesses, and if a random access procedure or a scheduling request procedure is initiated due to the one or more specific MO accesses:
      determining, by the UE, to apply the access control parameter;
      applying, by the UE, the determined access control parameter; and
      transmitting, by the UE, the random access preamble or the scheduling request according to the applied access control parameter.

2. The method of claim 1, further comprising:
   receiving a configuration, which indicates whether the UE should apply the access control parameter or the backoff parameter, from the network.

3. The method of claim 1, wherein the access control parameter is one of access class barring information received from system information or service specific access control information received from the system information.

4. The method of claim 1, wherein the access control parameter indicates skipping of applying a random access backoff for the random access preamble or the scheduling request.

5. The method of claim 1, wherein the access control parameter includes a barring time and a barring factor.

6. The method of claim 1, wherein the access control parameter is received via one of system information, a random access response, medium access control (MAC) control element, or a radio resource control (RRC) message on a dedicated control channel (DCCH).

7. The method of claim 1, wherein the one or more specific mobile originating (MO) accesses includes at least one of emergency access, high priority access, access for Internet protocol (IP) multimedia subsystem (IMS) signaling, access for multimedia telephony (MMTEL) applications, mobile terminating access, or access for mobile originating signaling.

8. The method of claim 1, further comprising:
determining, by the UE, whether or not to delay transmission of the random access preamble or the scheduling request according to the applied access control parameter.

9. The method of claim 1, wherein the UE is in an RRC connected state (RRC_CONNECTED).

10. A user equipment (UE) in a wireless communication, the UE comprising:
a radio frequency (RF) unit for transmitting or receiving a radio signal; and
a processor, coupled to the RF unit, that:
controls the RF unit to receive an access control parameter and a backoff parameter from a network; and
if the access control parameter indicates that the UE should apply the access control parameter before transmitting a random access preamble or a scheduling request for one or more specific mobile originating (MO) accesses, and if a random access procedure or a scheduling request procedure is initiated due to the one or more specific MO accesses:
determines to apply the access control parameter;
applies the determined access control parameter; and
controls the RF unit to transmit the random access preamble or the scheduling request according to the applied access control parameter.

11. The UE of claim 10, wherein the processor controls the RF unit to receive a configuration, which indicates whether the UE should apply the access control parameter or the backoff parameter, from the network.

* * * * *

UNITED STATES PATENT AND TRADEMARK OFFICE
CERTIFICATE OF CORRECTION

PATENT NO. : 9,867,216 B2
APPLICATION NO. : 14/897197
DATED : January 9, 2018
INVENTOR(S) : Youngdae Lee et al.

Page 1 of 2

It is certified that error appears in the above-identified patent and that said Letters Patent is hereby corrected as shown below:

In the Claims

In Column 18, Line 45 through Column 20, Line 26:
Delete the current claims listed and insert the following claims:
--1. A method for performing, by a user equipment (UE), access control in a wireless communication, the method comprising:
receiving, by the UE, an access control parameter from a network,
wherein the access control parameter indicates that the UE should apply the access control parameter for at least one specific mobile originating (MO) access before transmitting a random access preamble or a scheduling request;
initiating, by the UE, a random access procedure or a scheduling request procedure; and
if the random access procedure or the scheduling request procedure is initiated due to an access included in the at least one specific MO access:
determining, by the UE, to apply the access control parameter;
applying, by the UE, the determined access control parameter; and
transmitting, by the UE, the random access preamble or the scheduling request according to the applied access control parameter,
wherein the at least one specific MO access includes at least one of emergency access, high priority access, access for Internet protocol (IP) multimedia subsystem (IMS) signaling, access for multimedia telephony (MMTEL) applications, mobile terminating access, or access for mobile originating signaling.

2. The method of claim 1, further comprising:
receiving a configuration, which indicates whether the UE should apply the access control parameter or a backoff parameter, from the network.

3. The method of claim 1, wherein the access control parameter is one of access class barring information received from system information or service specific access control information received from the system information.

Signed and Sealed this
Ninth Day of October, 2018

Andrei Iancu
*Director of the United States Patent and Trademark Office*

4. The method of claim 1, wherein the access control parameter indicates skipping of applying a random access backoff for the random access preamble or the scheduling request.

5. The method of claim 1, wherein the access control parameter includes a barring time and a barring factor.

6. The method of claim 1, wherein the access control parameter is received via one of system information, a random access response, medium access control (MAC) control element, or a radio resource control (RRC) message on a dedicated control channel (DCCH).

7. The method of claim 1, further comprising:
determining, by the UE, whether or not to delay transmission of the random access preamble or the scheduling request according to the applied access control parameter.

8. The method of claim 1, wherein the UE is in an RRC connected state (RRC_CONNECTED).

9. A user equipment (UE) in a wireless communication, the UE comprising:
a radio frequency (RF) unit for transmitting or receiving a radio signal; and
a processor, coupled to the RF unit, that:
controls the RF unit to receive an access control parameter from a network,
wherein the access control parameter indicates that the UE should apply the access control parameter for at least one specific mobile originating (MO) access before transmitting a random access preamble or a scheduling request:
initiates a random access procedure or a scheduling request procedure; and
if the random access procedure or the scheduling request procedure is initiated due to an access included in the at least one specific MO access:
determines to apply the access control parameter;
applies the determined access control parameter; and
controls the RF unit to transmit the random access preamble or the scheduling request according to the applied access control parameter,
wherein the at least one specific MO access includes at least one of emergency access, high priority access, access for Internet protocol (IP) multimedia subsystem (IMS) signaling, access for multimedia telephony (MMTEL) applications, mobile terminating access, or access for mobile originating signaling.

10. The UE of claim 9, wherein the processor controls the RF unit to receive a configuration, which indicates whether the UE should apply the access control parameter or a backoff parameter, from the network.--